DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 9

T946,009

POLYESTER COMPOSITION

Clive Percy Smith, Wheathampstead, England, assignor to Imperial Chemical Industries Limited, London, England

Filed Apr. 14, 1975, Ser. No. 568,132
Claims priority, application Great Britain, May 6, 1974, 19,810/74
Int. Cl. C08k *3/22*
U.S. Cl. 260—40 R
No Drawing. 11 Pages Specification

Fire retardant thermoplastic polyester compositions are prepared by polymerization in the solid phase at a temperature below the melting point of the polyester to increase its molecular weight. The process provides for effective incorporation of fire retardant materials into the polyester composition without substantial degradation of the polyester and loss in molecular weight.

The process of increasing the molecular weight of a thermoplastic polyester includes the steps of heating at a temperature from 5° C. to 70° C., preferably 10° C. to 50° C., below the melting point of the polyester, an intimate mixture of the thermoplastic polyester, such as poly(tetramethylene terephthalate), and from 0.5% to 10% by weight of the polyester of an oxide of a Group *Vb* metal, such as antimony trioxide. Optionally, halogenated aromatic compounds like decarbromodiphenyl ether are also included, in the weight ratio of halogen compound to oxide of between 0.5:1 and 4:1. The amount of fire retardant material or materials added to the polyester to render the composition non-burning depends upon the efficiency of the additive; generally from 5–15% by weight of the polyester is normally effective.